(12) United States Patent
Lyle

(10) Patent No.: US 8,082,310 B2
(45) Date of Patent: Dec. 20, 2011

(54) SELECTIVE PUBLICATION OF E-MAIL ACCOUNT ACCESS FREQUENCY

(75) Inventor: Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 12/253,104

(22) Filed: Oct. 16, 2008

(65) Prior Publication Data

US 2010/0100595 A1   Apr. 22, 2010

(51) Int. Cl.
*G06F 15/16* (2006.01)
(52) U.S. Cl. ........................................ 709/206; 709/204
(58) Field of Classification Search .................. 709/204, 709/205, 206, 207
See application file for complete search history.

(56) References Cited

U.S. PATENT DOCUMENTS

| 2007/0011230 A1* | 1/2007 | Clech et al. | 709/204 |
| 2010/0031180 A1* | 2/2010 | Shin et al. | 715/771 |

* cited by examiner

*Primary Examiner* — Peling Shaw
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to e-mail account management and provide a method, system and computer program product for selective publication of e-mail account access frequency. In an embodiment of the invention, a method for selective publication of e-mail account access frequency can be provided. The method can include determining access frequency data for different e-mail accounts of a first e-mail user in a messaging data processing system, receiving a request from a second e-mail user in the messaging data processing system for the access frequency data, applying publication rules for the first e-mail user to the second e-mail user to determine whether or not to publish the access frequency data to the second e-mail user, and publishing at least part of the access frequency data to the second e-mail user if permitted by the application of the publication rules.

15 Claims, 2 Drawing Sheets

SELECTIVE PUBLICATION OF E-MAIL ACCOUNT ACCESS FREQUENCY

BACKGROUND OF THE INVENTION

1. Field of the Invention

The present invention relates to the field of electronic mail (e-mail) and more particularly to publishing e-mail subscriber information in an e-mail system.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications, save for voice telephony.

E-mail has become a ubiquitous tool indispensable for the average person in both the work environment and home environment. As such, it is not unusual for individuals to enjoy multiple different e-mail addresses subscribed to correspondingly different e-mail accounts. Specifically, oftentimes users subscribe to each of a corporate e-mail account, a personal e-mail account, and in some cases a university account or an e-mail account for another social, educational, political or business organization. Thus, checking one's inbox for each e-mail account can become a tedious exercise for an e-mail user.

Users handle the problem of multiple e-mail accounts in a number of ways. For many, users choose to auto forward e-mail from one account into a master account that is checked frequently. For others, users configure a singular e-mail client to aggregate e-mail messages from all accounts. For most, however, users simply only check some accounts with frequency, while checking other accounts on an infrequent basis. Failing to check an e-mail account with great frequency, however, defeats the instantaneous nature of e-mail. Thus, the expectation of a sender of e-mail to a recipient that the recipient will review the e-mail expeditiously will be defeated if the e-mail is sent to an e-mail account of the recipient that is not checked with great frequency. Ironically, if the recipient checks the e-mail account with less frequency than a week, the sender would have been better suited to send the message in the e-mail by regular postal service.

BRIEF SUMMARY OF THE INVENTION

Embodiments of the present invention address deficiencies of the art in respect to e-mail account management and provide a novel and non-obvious method, system and computer program product for selective publication of e-mail account access frequency. In an embodiment of the invention, a method for selective publication of e-mail account access frequency can be provided. The method can include determining access frequency data for different e-mail accounts of a first e-mail user in a messaging data processing system, receiving a request from a second e-mail user in the messaging data processing system for the access frequency data, applying publication rules for the first e-mail user to the second e-mail user to determine whether or not to publish the access frequency data to the second e-mail user, and publishing at least part of the access frequency data to the second e-mail user if permitted by the application of the publication rules.

In one aspect of the embodiment, the method also can include storing the access frequency data in connection with an address book entry for the first e-mail user in an address book of the second e-mail user. In another aspect of the embodiment, the method also can include displaying the access frequency data in a tool tip activated in response to a mouse over associated with a reference to the first e-mail user in an e-mail client of the second e-mail user. In yet another aspect of the embodiment, all of the access frequency data can be published to the second e-mail user if the second e-mail user is referenced in an address book entry in an address book for the first e-mail user. In even yet another aspect of the embodiment, only a summary of the access frequency data can be published to the second e-mail user if the second e-mail user is referenced in an e-mail recently composed by the first e-mail user for delivery to the second e-mail user.

In another embodiment of the invention, a messaging data processing system can be configured for selective publication of e-mail account access frequency. The system can include an instant messaging (IM) server configured for communicative coupling to different e-mail users each accessing multiple different e-mail accounts. The system also can include a set of publication rules for the different e-mail users. Finally, the system can include selective publication of access frequency data logic disposed in the IM server and coupled to the set of publication rules. The logic can include program code enabled to respond to a request from a second e-mail user for the access frequency data of a first e-mail user, to apply a portion of the set of publication rules pertaining to the first e-mail user to the second e-mail user to determine whether or not to publish the access frequency data to the second e-mail user, and to publish at least part of the access frequency data to the second e-mail user if permitted by the application of the set of publication rules pertaining to the second e-mail user.

In an aspect of the embodiment, the publication rules can permit publication of all access frequency data for the first e-mail user if the second e-mail user in associated with an address book entry for an address book of the first e-mail user. In another aspect of the embodiment, the publication rules can permit publication of only a portion of the access frequency data for the first e-mail user if the second e-mail user in an addressee for an e-mail previously composed by the first e-mail user. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for selective publication of e-mail account access frequency. In accordance with an embodiment of the present invention, the frequency in which a particular e-mail user accesses each different e-mail account subscribed to by the particular e-mail user can be computed. Another e-mail user intending to transmit an e-mail message to the particular e-mail user can query the frequency for each e-mail account in order to select an e-mail account to receive the e-mail message. In this way, the expectation of the other e-mail user can be properly established according to the frequency in which the particular e-mail user accesses the inbox of the selected e-mail account.

Figure 1:
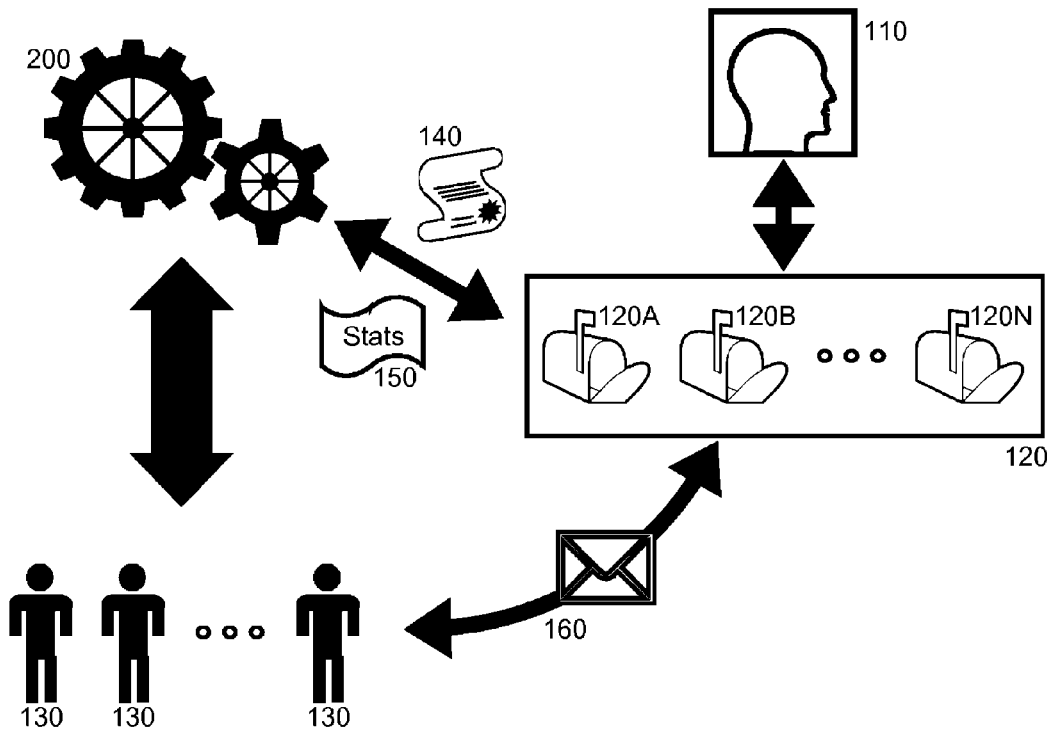
FIG. 1 is a pictorial illustration of a process for selective publication of e-mail account access frequency.

In further illustration, FIG. 1 pictorially shows a process for selective publication of e-mail account access frequency. As shown in FIG. 1, a particular e-mail user 110 can maintain an e-mail presence 120 through different e-mail accounts 120A, 120B, 120N accessed by the e-mail user 110 with some or no frequency. Other e-mail users 130 can compose and transmit e-mail messages 160 to selected ones of the different e-mail accounts 120A, 120B, 120N according to published e-mail account access frequency statistics 150 for the different e-mail accounts 120A, 120B, 120N.

Specifically, a messaging data processing system 200 configured for selective publication of e-mail account access frequency can process different requests from the e-mail users 130 to discover the e-mail account access frequency statistics 150 for the particular e-mail user 110. The messaging data processing system 200, in turn, can compare the identity of each of the e-mail users 130 requesting discovery of the e-mail account access frequency statistics 140 to a set of publication rules 140. The publication rules 140, for example, can set forth based upon the identity of a requesting one of the e-mail users 130 whether to forward the e-mail account access frequency statistics 140 to the requesting one of the e-mail users 130, to deny the request, or to provide a limited subset of the e-mail account access frequency statistics 140, such as summary statistics or merely a recommendation or ranking of the different e-mail accounts 120A, 120B, 120N from most frequently accessed to least frequently accessed.

Figure 2:
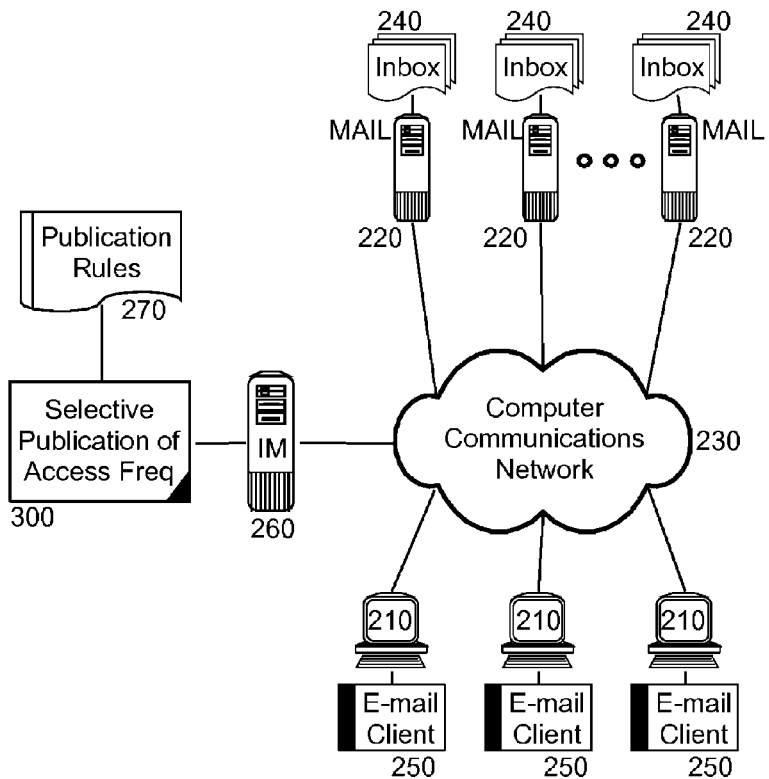
FIG. 2 is a schematic illustration of a messaging data processing system configured for selective publication of e-mail account access frequency; and, FIG. 3 is a flow chart illustrating a process for selective publication of e-mail account access frequency.

In more particular illustration, FIG. 2 is a schematic illustration of a messaging data processing system configured for selective publication of e-mail account access frequency. The system can include one or more e-mail servers 220 each providing multiple different e-mail accounts 240 for different e-mail users. Access to the different e-mail accounts 240 can be provided over computer communications network 230 to host computing devices 210, each supporting one or more e-mail clients 250. In this way, e-mail users through e-mail clients 250 can send and receive e-mail messages to and from the e-mail accounts 240 over the e-mail servers 220.

Notably, selective publication of access frequency logic 300 can be provided in the system. For example, the selective publication of access frequency logic 300 can be included as part of an instant messaging server 260 associated with the e-mail accounts 240 as part of a larger, collaborative computing environment such as the Lotus™ Domino™ collaborative computing environment manufactured by IBM Corporation of Armonk, N.Y. The selective publication of access frequency logic 300 can include computer program code enabled to receive requests from the e-mail clients 250 for access frequency data for a given e-mail user associated with a particular one of the e-mail accounts 240.

Specifically, the computer program code of the selective publication of access frequency logic 300 upon receipt of a request for access frequency data for a target e-mail user from one of the e-mail clients 250 on behalf of a requesting e-mail user can be enabled to compare the identity of the requesting e-mail user to publication rules 270 for the target e-mail user. The publication rules 270 can specify when to deny the request, when to fulfill the request with only a limited subset of access frequency data, or when to provide a complete revelation of the access frequency data to the requesting e-mail user.

By way of example, the publication rules 270 can deny the request when the identity of the requesting e-mail user is not known within the address book of the target e-mail user. However, the publication rules 270 can permit a summary form of the access frequency data where the target e-mail user has composed and/or transmitted an e-mail message to the requesting user recently. Finally, the publication rules 270 can permit a full accounting of the access frequency data when the requesting e-mail user is known to the target e-mail user within the address book of the target e-mail user.

In any case, once the access frequency data has been returned to the requesting e-mail user, the access frequency data can be incorporated into an address book entry of the requesting e-mail user for the target e-mail user such that at subsequent times, a mouse over or selection of a particular e-mail address of the target e-mail user will present a tool tip with access frequency data. Alternatively, the access frequency data can be presented ephemerally in a pop up window in direct response to the request for access frequency data by the requesting e-mail user.

Even yet further, address book entries of the requesting e-mail user can be managed according to the access frequency data. For example, address book entries can be removed when the access frequency data indicates an access frequency that does not exceed a threshold value. As another example, address book entries can be sorted according to frequency of access specified by the access frequency data. In any event, by presenting the access frequency data to the requesting e-mail user, the requesting e-mail user will have a proper expectation as to when the target e-mail user is likely to read the e-mail message dependant upon to which of the e-mail accounts 240 for the target e-mail user the e-mail message is transmitted.

Figure 3:
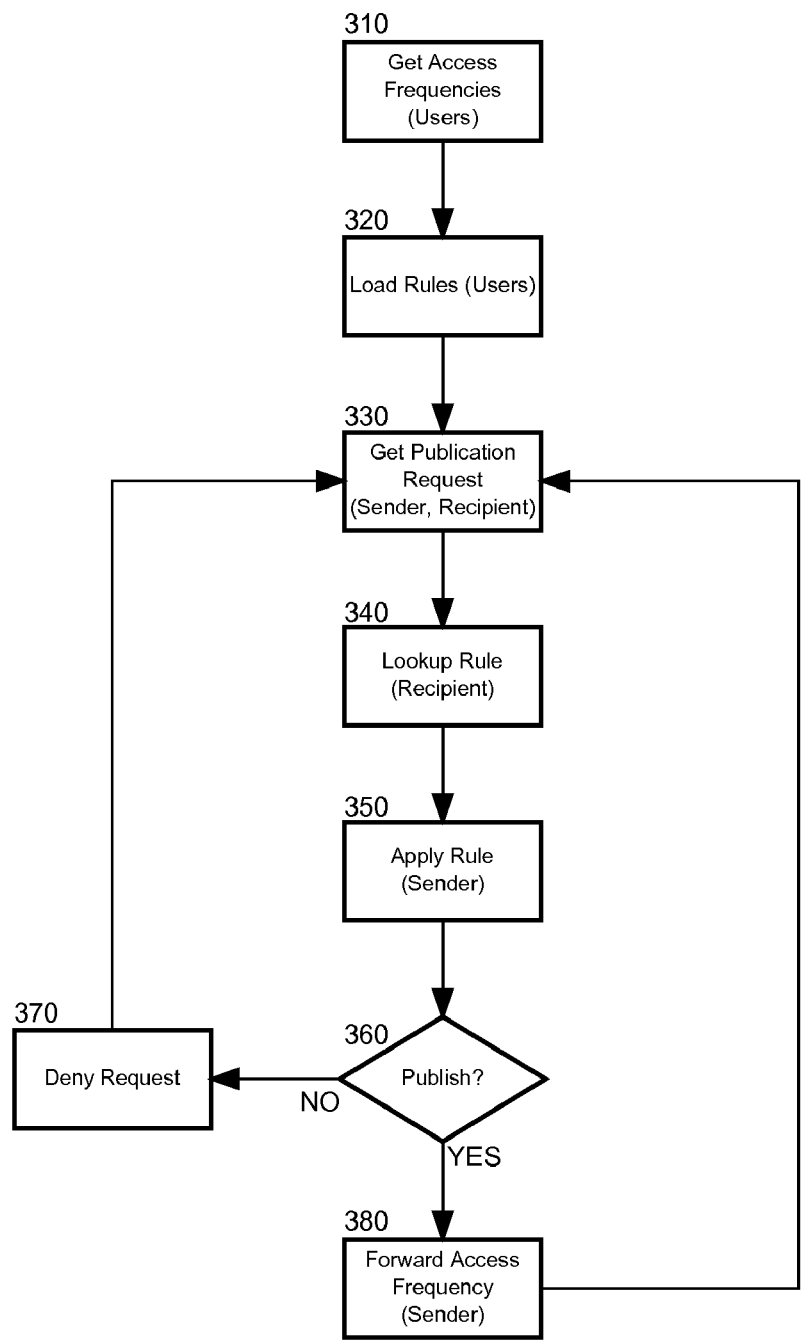

In yet further illustration of the operation of the selected publication of access frequency logic 300, FIG. 3 is a flow chart illustrating a process for selective publication of e-mail account access frequency. The process can begin in block 310 with the retrieval of access frequency data for different e-mail users. The access frequency data can indicate how often a particular e-mail user accesses an inbox for a corresponding e-mail account. In this regard, the access frequency data not only can provide statistical data, but also as an option, the access frequency data can include a detailed accounting date and time information for when each inbox has been accessed by a corresponding e-mail user.

In block 320, publication rules can be loaded for each of the e-mail users. Thereafter, in block 330, a publication request can be received from a sender of an e-mail intended to be addressed to a recipient. In block 340, the publication rules can be queried for the recipient and in block 350 the publication rules for the recipient can be applied to the identity of the sender. In decision block 360, it can be determined based upon the application of the publication rules whether or not to publish access frequency data for the recipient to the sender. If not, in block 370 the request can be denied. Otherwise, in block 380 the access frequency data can be forwarded to the sender.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for selective publication of e-mail account access frequency, the method comprising:
   determining access frequency data for different e-mail accounts of a first e-mail user in a messaging data processing system;
   receiving a request from a second e-mail user in the messaging data processing system for the access frequency data;
   applying publication rules for the first e-mail user to the second e-mail user to determine whether or not to publish the access frequency data to the second e-mail user; and,
   publishing at least part of the access frequency data to the second e-mail user if permitted by the application of the publication rules.

2. The method of claim 1, further comprising
   storing the access frequency data in connection with an address book entry for the first e-mail user in an address book of the second e-mail user.

3. The method of claim 1, further comprising
   displaying the access frequency data in a tool tip activated in response to a mouse over associated with a reference to the first e-mail user in an e-mail client of the second e-mail user.

4. The method of claim 1, further comprising
   managing an address book entry for an address book of the second e-mail user according to the access frequency data of the first e-mail user.

5. The method of claim 1, wherein
   all of the access frequency data is published to the second e-mail user if the second e-mail user is referenced in an address book entry in an address book for the first e-mail user.

6. The method of claim 1, wherein
   only a summary of the access frequency data is published to the second e-mail user if the second e-mail user is referenced in an e-mail recently composed by the first e-mail user for delivery to the second e-mail user.

7. A messaging data processing system configured for selective publication of e-mail account access frequency, the system comprising:
   an instant messaging (IM) server configured for communicative coupling to different e-mail users each accessing multiple different e-mail accounts;
   a set of publication rules for the different e-mail users; and,
   selective publication of access frequency data logic disposed in the IM server and coupled to the set of publication rules, the logic comprising program code enabled to
      respond to a request from a second e-mail user for the access frequency data of a first e-mail user, to
      apply a portion of the set of publication rules pertaining to the first e-mail user to the second e-mail user to determine whether or not to publish the access frequency data to the second e-mail user, and to
      publish at least part of the access frequency data to the second e-mail user if permitted by the application of the set of publication rules pertaining to the second e-mail user.

8. The system of claim 7, wherein
   the publication rules permit publication of all access frequency data for the first e-mail user if the second e-mail user in associated with an address book entry for an address book of the first e-mail user.

9. The system of claim 7, wherein
   the publication rules permit publication of only a portion of the access frequency data for the first e-mail user if the second e-mail user in an addressee for an e-mail previously composed by the first e-mail user.

10. A computer program product comprising a computer usable storage medium having stored therein computer usable program code for selective publication of e-mail account access frequency, the computer usable program code, which when executed by a computer hardware system causes the computer hardware system to perform:
   determining access frequency data for different e-mail accounts of a first e-mail user in a messaging data processing system;

receiving a request from a second e-mail user in the messaging data processing system for the access frequency data;

applying publication rules for the first e-mail user to the second e-mail user to determine whether or not to publish the access frequency data to the second e-mail user; and publishing at least part of the access frequency data to the second e-mail user if permitted by the application of the publication rules.

11. The computer program product of claim 10, wherein the computer usable program code further causes the computer hardware system to perform storing the access frequency data in connection with an address book entry for the first e-mail user in an address book of the second e-mail user.

12. The computer program product of claim 10, wherein the computer usable program code further causes the computer hardware system to perform displaying the access frequency data in a tool tip activated in response to a mouse over associated with a reference to the first e-mail user in an e-mail client of the second e-mail user.

13. The computer program product of claim 10, wherein the computer usable program code further causes the computer hardware system to perform managing an address book entry for an address book of the second e-mail user according to the access frequency data of the first e-mail user.

14. The computer program product of claim 10, wherein all of the access frequency data is published to the second e-mail user if the second e-mail user is referenced in an address book entry in an address book for the first e-mail user.

15. The computer program product of claim 10, wherein only a summary of the access frequency data is published to the second e-mail user if the second e-mail user is referenced in an e-mail recently composed by the first e-mail user for delivery to the second e-mail user.

* * * * *